United States Patent Office 3,523,709
Patented Aug. 11, 1970

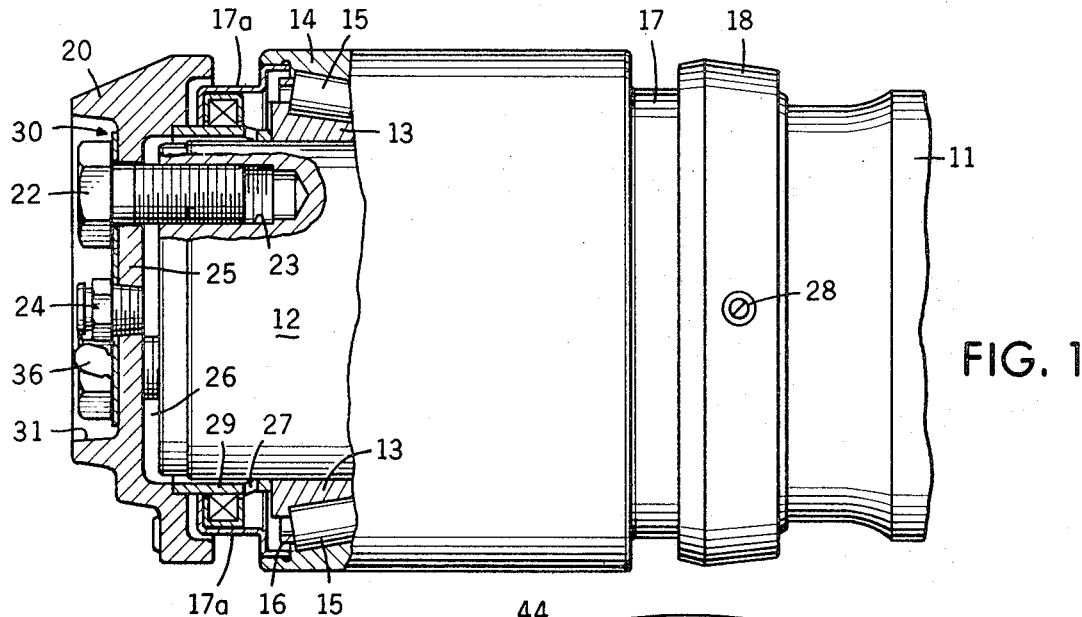
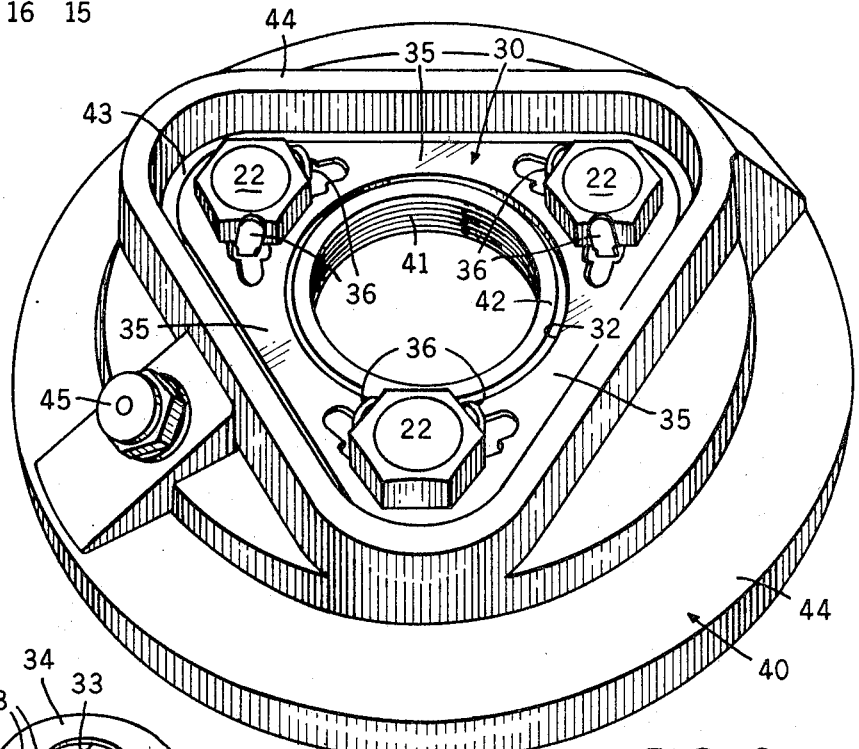
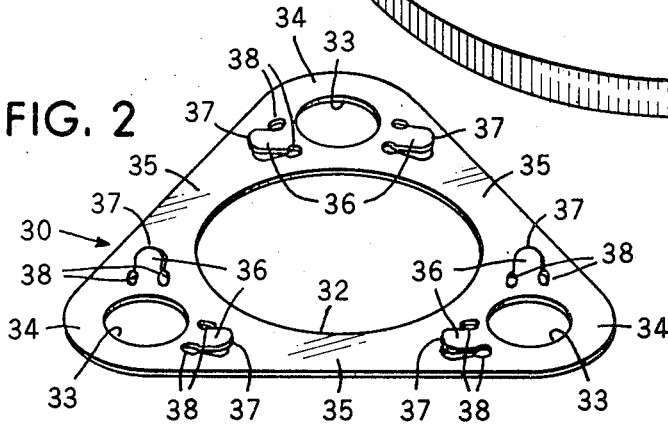

3,523,709
LOCKING PLATE FOR AXLE END CAP
Robert F. Heggy, Canton, and James D. Morton, Louisville, Ohio, assignors to The Timken Roller Bearing Company, Canton, Ohio, a corporation of Ohio
Filed Nov. 20, 1967, Ser. No. 684,276
Int. Cl. F16b *39/10;* B60b *35/16;* F16c *35/04*
U.S. Cl. 295—36                         3 Claims

ABSTRACT OF THE DISCLOSURE

A locking plate for the axle end cap of railroad bearings in which the plate is provided with an enlarged central aperture, a plurality of cap screw apertures spaced about the central aperture, and one or more cap screw locking tabs lanced in the material of the plate so as to be integral therewith.

---

This invention relates to an improved locking plate having integral cap screw locking tabs for securing cap screws in position to hold an axle end cap in position on a railroad bearing assembly.

The problem with current means to lock the cap screws in place on an axle end cap is that the delicate character of such locking means makes it easy to twist or damage the latter under the high torque required to be applied to the cap screws. It is also a problem to provide a locking plate with tabs that are sufficiently strong to maintain the required cap screw engagement. Furthermore, the current locking means is easily subject to distortion and fracture during torqueing of the cap screws with the result that there is no security in retaining the cap screws.

The presently improved locking plate having the locking tabs lanced in the plate material overcomes the foregoing problems and results in assurance that the cap screws are secured with the required high torque. It is also a feature of the present locking plate that it is considerably stronger and resists distortion, and can be manufactured more economically.

A particularly important object of the present invention is to provide an integral or one-piece plate with cap screw locking tabs that are formed within the body of the plate so as to gain strength and increase resistance to distortion.

It is also an important object of the present invention to provide a locking plate for an axle bearing end cap in which there may be formed an enlarged central aperture to accommodate the application of various accessory devices to the axle without incuring interference problems.

A further object of the present invention is to provide a locking plate for axle end cap securement in which the cap screw locking tabs are located to be free from damage and distortion.

Still another object of this invention is to provide a locking plate of the foregoing character with locking tabs that are lanced in the plate so as to avoid removal of plate material when forming such tabs.

Other objects and attendant advantages of this invention will be more particularly set forth and described in the following specification and with reference to the accompanying drawings, wherein:

FIG. 1 is a partially sectioned elevational view of a typical railroad axle bearing assembly showing the improved locking plate of this invention incorporated therein for the purpose of securing the cap screws which secure the axle end cap in position;

FIG. 2 is an enlarged perspective view of the improved locking plate showing its preferred construction and arrangement of the locking tabs; and FIG. 3 is a greatly enlarged perspective view of an end cap and cap screws with the locking plate in operative assembly, the view particularly showing the locking tabs bent against the cap screws and the enlarged central aperture therein.

Referring now to the several views of the drawing, and particularly to FIG. 1, there is shown a typical bearing assembly 10 for an axle member 11 which is connected with the flanged wheels for a railroad car truck. The axle has a journal portion 12 on which are mounted suitable bearing cones 13 and an outer bearing cup 14. The cones and cup are formed with raceways for tapered rollers 15 located in proper operating position by suitable cage means 16. A suitable seal 17 is carried by the adjacent end of the cup 14 and there is also provided a backing ring 18 which is seated against a shoulder portion on the axle 11 in the usual manner. The outer end of the axle journal 12 is also circumferentially enclosed by a second seal 17a. The seal 17a cooperates with a seal wear ring 19, just as the inboard seal 17 cooperates with a similar wear ring (not shown). An axle bearing end cap 20 is disposed over the end of the journal 12 and is provided with an internal annular seat 21 engaged over the adjacent end of the wear ring 19 so that when the cap screws 22 are threaded into the axle journal 12 at threaded apertures 23, the end cap 20 can exert an axial load on the wear ring 19 and thereby secure cones 13 in the desired operating position on the axle journal. In the example shown, a lubricant fitting 24 is threaded into the central web 25 of the end cap 20 so as to be located in a position to supply lubricant to the space 26 underneath the cap, and this space communicates circumferentially around the end of the axle journal 12 to supply lubricant to distribution apertures 27 in the seal wear ring 19. The internal spaces of the bearing assembly are suitably vented, in a manner well known, by a vent fitting shown at 28 carried in the backing ring.

The assembly shown in FIG. 1 is provided with a locking plate 30 which is disposed in the outwardly opening recess 31 of the end cap 20 and is located under the heads of the cap screws 22. The end cap 20 must be secured under a required minimum axial loading in order to retain the bearing assembly in operating position, and for this reason the cap screws 22 are threaded home under a predetermined high torque loading which squeezes the locking plate 30 as well as stresses the locking plate areas under the cap screws with a twisting reaction because of the torque applied to the cap screws 22.

The particular feature of the present invention is the improvement of the locking plate 30 and attention will now be directed to FIGS. 2 and 3 for details thereof. It is noted that the end cap shown in FIG. 3 is shown in a modified form for purposes of illustrating an additional advantage obtained by the presently improved locking plate.

There is shown in FIG. 2 the locking plate which in the present case has the general shape or outline of an isosceles triangle. The locking plate is made of suitable material having a desired thickness, and can be punched out of strip stock so as to form, in one operation, the enlarged circular aperture 32 and the cap screw apertures 33 which are distributed substantially equidistantly about the central aperture 32 and are confined to the enlarged plate surface areas 34 thereof. It is, therefore, a particular feature and advantage to form the locking plate in the manner shown in FIG. 2 so that there are a plurality of enlarged plate areas 34 joined by substantial connecting webs 35 for unifying the enlarged plate areas 34 into a one-piece locking plate member. Each enlarged area 34 is provided with spaced locking tabs 36 that are lanced out of the material of these areas along the respective parting lines 37. The root ends of the parting lines 37 are defined by apertures 38 which may be punched at the time of the lancing of the tabs 36, or at some other suitable point in the process of stamping out the locking plate 30.

Attention is now directed to FIG. 3 where the locking plate 30 is shown in assembled position on an axle bearing end cap 40. The end cap 40 differs from the end cap 20 of FIG. 1 in that there is an enlarged circular aperture 41 therein surrounded by a raised circular flange 42. The flange 42 extends above the bottom face of the end cap recess 43, but well within the limitation of the triangulated wall 44 which projects outwardly from the base 44 of the end cap 40. The triangulated form of the end cap wall 44 affords suitable protection for the cap screws 22 that are equidistantly distributed around the circular aperture 41. It is appreciated that the locking plate 30 is quite easily fitted into the wall 44 and lies upon the face of the circular web 43 of the end cap so as to have its aperture 32 fitted around the raised flange 42 of the end cap. The cap screws 22 are then passed through the locking plate screw apertures 33 (FIG. 2) and are threaded down under proper torque so as to screw the end cap 40 in a position corresponding to the end cap 20 shown in FIG. 1. After the cap screws 22 are properly torqued into position the locking tabs 36 can then be bent upwardly against the flat surfaces of the cap screws so as to retain these screws in the desired assembled position.

It can be appreciated from the disclosure in FIG. 3 that the twisting reaction imparted to the locking plate 30 as each cap screw 22 is torqued into position will be resisted by the connecting web portions 35, and this is assured since the locking plate 30 and the connecting web portions 35 have the shape and size to fit relatively snuggly in the end cap recess between the raised surrounding wall 44 and the internally positioned raised flange 42 at the circular aperture 41. In other words, the particular design of the locking plate 30 and the positioning of the cap screw receiving apertures 33 and locking tabs 36 places the vulnerable parts of the locking plates in areas where there is sufficient material to provide the strength needed for resisting distortion due to the twisting of the screws 22 into position under high torque loading.

One of the important advantages for the present locking plate 30 is illustrated in FIG. 3, and that is that the locking plate easily accommodates itself to an axle end cap like the one shown at 40 which has an enlarged central aperture 31 for the purpose of receiving drive devices commonly applied to railroad axles. Such drive devices include train control governors and receivers, as well as axle alternators and speed recorders. These are a few of the devices which are well known in connection with the operation of railroad equipment. When the central aperture 41 is provided in the end cap, the lubricant fitting, such as is shown at 24 for the end cap 20 of FIG. 1, is necessarily moved to the position shown at 45 in FIG. 3.

It will appear quite readily from the foregoing description that the presently improved locking plate may be economically and quite easily stamped from sheet material to result in a one-piece locking plate having the locking tabs and cap screw apertures disposed within the material of the plate at areas where considerable strength can be maintained. It is also easily appreciated from the view in FIG. 2 that the locking tabs 36 are disposed internally of the locking plate areas 34 and do not project radially inwardly so as to interfere with the provision of the circular aperture 32. The tabs 36 are directed generally tangentially of and spaced from the aperture 32 so as not to interfere with the centrally apertured end cap such as that shown at 40 in FIG. 3. Accordingly, the improved locking plate is rendered substantially universal in that it will accommodate itself to a variety of axle end cap designs, two of which are shown in FIGS. 1 and 3 respectively. Heretofore locking plates adopted for end caps of the type shown in FIG. 1 or 3 have embodied an arrangement wherein the bendable tabs project radially inwardly and lie in the circular web area of the end cap. With the locking tabs thus positioned, there is an immediate interference problem should an end cap of the design shown in FIG. 3 be desired, because the tabs would project inwardly beyond the raised flange 42. Furthermore, the presently improved locking tab permits the possibility of shipping an end cap with a large drive device preassembled thereto, as the locking plate 30 may be dropped into position and the locking tabs 36 can later be bent outwardly to secure the cap screws 22 at the time of assembly on the axle.

What is claimed is:

1. In a unitary locking plate for a group of cap screws holding a cover in place, the cover having a central opening with spaced openings around said central opening, each screw having a head cap and a threaded shank to extend through one of the apertures the cover and being spaced from the central cover opening, the improvement of a sheet member formed with an enlarged central aperture to register with the central opening in the cover and a plurality of cap screw receiving apertures spaced from said enlarged central aperture and from each other, said cap screw receiving apertures being spaced inwardly from the adjacent margins of said sheet member, and tab means lanced from said sheet member adjacent each cap screw aperture, each said tab means remaining connected to said sheet member adjacent a bending axis and being oriented to extend when lying flatwise in said sheet member generally tangentially of said central aperture and being movable out of said sheet member from said bending axis to project therefrom along side the cap screws mounted in the receiving apertures.

2. The improvement set forth in claim 1 wherein each said tab means lanced from said sheet member is defined by a parting line having root ends and having punched openings at said root ends, the punched openings being spaced apart and defining the ends of said bending axis along which said tab means is movable.

3. In a unitary locking plate for a group of cap screws used to hold a cover member in place, the cover member having a recessed area formed with a centrally located opening and cap screw receiving openings distributed about said centrally located opening, the improvement of a locking plate having a central aperture registrable with said central opening and cap screw receiving apertures spaced inwardly of the margins of said plate and aligned with said screw receiving openings, and locking tab means lanced from the material of said locking plate by parting lines defining the free margins of said locking tab means, said parting lines terminating at punched openings spaced apart along a bending axis oriented to extend generally radially relative to said central aperture, whereby said bending axis orients said tab means generally tangentially of said central opening.

References Cited

UNITED STATES PATENTS

| 2,045,005 | 6/1936 | Whitacre | 308—180 |
| 3,061,385 | 10/1962 | Horger et al. | 308—180 |
| 2,977,138 | 3/1961 | Brittain | 308—180 XR |
| 3,168,774 | 2/1965 | Volkening | 308—180 XR |
| 3,339,015 | 8/1967 | Gunthel | 151—53 XR |

ARTHUR L. LA POINT, Primary Examiner

H. BELTRAN, Assistant Examiner

U.S. Cl. X.R.

105—218; 151—53; 308—180